US010607021B2

(12) United States Patent
McDonald et al.

(10) Patent No.: US 10,607,021 B2
(45) Date of Patent: Mar. 31, 2020

(54) MONITORING USAGE OF AN APPLICATION TO IDENTIFY CHARACTERISTICS AND TRIGGER SECURITY CONTROL

(71) Applicant: Bank of America Corporation, Charlotte, NC (US)

(72) Inventors: Katherine McDonald, Charlotte, NC (US); Nicolette Boyd, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 262 days.

(21) Appl. No.: 15/881,218

(22) Filed: Jan. 26, 2018

(65) Prior Publication Data

US 2019/0236294 A1    Aug. 1, 2019

(51) Int. Cl.
*G06F 21/00* (2013.01)
*G06F 21/62* (2013.01)
(Continued)

(52) U.S. Cl.
CPC ........ *G06F 21/6218* (2013.01); *G06F 16/951* (2019.01); *G06F 21/54* (2013.01); *G06F 21/552* (2013.01); *H04L 63/20* (2013.01)

(58) Field of Classification Search
CPC .... G06F 21/6218; G06F 21/552; G06F 21/54; G06F 16/951; H04L 63/20; H04L 63/1433
See application file for complete search history.

(56) References Cited

U.S. PATENT DOCUMENTS 7,558,861 B1   7/2009 Qidwai et al.
7,694,308 B1   4/2010 Dickson et al.
(Continued)

FOREIGN PATENT DOCUMENTS

WO    2004023831 A1    3/2004

OTHER PUBLICATIONS

Schwartz et al., "All You Ever Wanted to Know about Dynamic Taint Analysis and Forward Symbolic Execution (but Might Have Been Afraid to Ask)", 2010 IEEE Symposium on Security and Privacy, Date of Conference: May 16-19 (Year: 2010).*

*Primary Examiner* — Morshed Mehedi
(74) *Attorney, Agent, or Firm* — Michael A. Springs; Moore & Van Allen PLLC; James C. Edwards

(57) ABSTRACT

A computing environment for monitoring usage of an application to identify characteristics and trigger security control includes an application system that performs a query configured to identify any application calls performed in a predetermined period of time within the computing environment; for each identified application call, builds a corresponding application characteristics entry in a database; for each identified application call, identifies a plurality of characteristics of the called application including at least one downstream resource; associates the identified plurality of characteristics with the application characteristics entry in the database, thereby creating an application mapping; identifies security controls associated with each of the applications in the application mapping; associates the identified security controls with the associated application characteristics entry in the application mapping; and automatically triggers assessment of an effectiveness of the security controls in response to identifying a future application call.

20 Claims, 4 Drawing Sheets

(51) Int. Cl.
*H04L 29/06* (2006.01)
*G06F 16/951* (2019.01)
*G06F 21/55* (2013.01)
*G06F 21/54* (2013.01)

(56) References Cited

U.S. PATENT DOCUMENTS

| | | | |
|---|---|---|---|
| 8,107,623 B2 | 1/2012 | Laitinen | |
| 8,438,644 B2 | 5/2013 | Watters et al. | |
| 9,027,125 B2 | 5/2015 | Kumar et al. | |
| 9,208,328 B2 * | 12/2015 | Russello | G06F 21/60 |
| 9,306,965 B1 | 4/2016 | Grossman et al. | |
| 9,338,175 B1 | 5/2016 | Ramos et al. | |
| 9,407,645 B2 | 8/2016 | Modi et al. | |
| 9,495,533 B2 | 11/2016 | Yiu et al. | |
| 9,584,536 B2 | 2/2017 | Nantel | |
| 9,591,010 B1 | 3/2017 | Muddu et al. | |
| 9,591,451 B1 | 3/2017 | Knight et al. | |
| 9,667,641 B2 | 5/2017 | Muddu et al. | |
| 9,680,846 B2 | 6/2017 | Haugsnes | |
| 9,762,617 B2 | 9/2017 | Modi et al. | |
| 10,073,679 B2 | 9/2018 | Straub et al. | |
| 2007/0011736 A1 * | 1/2007 | Kalibjian | G06F 21/52 726/14 |
| 2007/0150448 A1 | 6/2007 | Patnode | |
| 2008/0189757 A1 * | 8/2008 | Schackow | G06F 21/53 726/1 |
| 2009/0106431 A1 * | 4/2009 | Garfinkle | H04L 67/16 709/228 |
| 2014/0302877 A1 * | 10/2014 | Johnson | H04W 64/00 455/456.3 |
| 2015/0033341 A1 | 1/2015 | Schmidtler et al. | |
| 2015/0220734 A1 * | 8/2015 | Nalluri | G06F 21/51 726/23 |
| 2016/0261640 A1 | 9/2016 | Modi et al. | |
| 2017/0060798 A1 * | 3/2017 | Sakai | G06F 9/4413 |
| 2017/0169230 A1 * | 6/2017 | Zheng | G06F 21/577 |
| 2017/0171235 A1 | 6/2017 | Mulchandani et al. | |
| 2018/0218148 A1 * | 8/2018 | D'Errico | G06F 21/53 |

* cited by examiner

MONITORING USAGE OF AN APPLICATION TO IDENTIFY CHARACTERISTICS AND TRIGGER SECURITY CONTROL

FIELD

In general, embodiments of the invention relate to application security and, more particularly, to a system for monitoring usage of an application to identify characteristics and trigger security control.

BACKGROUND

In various technical environment implementations, application calls access data or resources from various sources, thereby potentially introducing security exposure. Therefore, a need exists to develop systems, apparatus, computer program products, methods and the like that provide for monitoring usage of an application to identify characteristics and trigger security control.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for monitoring usage of an application to identify characteristics and trigger security control.

According to embodiments, a computing environment comprises an originating system having a computing platform having a memory and at least one processor in communication with the memory; a plurality of networked communication channels each configured to communicate one or more of a plurality of instructions for interacting with one or more control systems and one or more downstream resources in response to calling of an originating application by the originating system; and an application system in operative communication with the originating system and the plurality of networked communication channels and for providing automatic application characteristic identification and triggering security control, and comprising a computing platform having a memory and at least one processor in communication with the memory, the memory comprising computer-executable instructions, that when executed cause the processor to perform a query configured to identify any application calls performed in a predetermined period of time within the computing environment; for each identified application call, build a corresponding application characteristics entry in a database; for each identified application call, identify a plurality of characteristics of the called application including at least one downstream resource; associate the identified plurality of characteristics of the called application with the application characteristics entry in the database, thereby creating an application mapping; identify one or more security controls associated with each of the applications in the application mapping; associate the identified one or more security controls with the associated application characteristics entry in the application mapping; and automatically trigger assessment of an effectiveness of the one or more security controls in response to identifying a future application call.

In some embodiments, the computer-executable instructions, when executed further cause the processor to periodically perform subsequent queries; and add an additional application characteristics entry in the application mapping of the database.

In some embodiments, the computer-executable instructions, when executed further cause the processor to automatically initiate a reporting transmission to one or more administrative systems, wherein the reporting transmission comprises information related to the assessment.

In some embodiments, the computer-executable instructions, when executed further cause the processor to initiate presentation of an administrative dashboard comprising information related to the assessment; access management controls; and exposure-application mapping information.

In some embodiments, the computer-executable instructions, when executed further cause the processor to transmit instructions to two or more disparate control systems requesting information related to at least two different security controls associated with the future application call, wherein at least one of the two different security controls are managed by each of the two or more control systems; receive responses from the two or more control systems; and communicate information from the responses to an administrative system.

In some embodiments, the computer-executable instructions, when executed further cause the processor to initiate communication of information related to the assessment to one or more control owners associated with the one or more security controls.

In some embodiments, the computer-executable instructions, when executed further cause the processor to in response to the assessment, automatically initiate remedial actions.

According to embodiments of the invention, a method for monitoring usage of an application to identify characteristics and trigger security control comprises performing, by an application system, a query configured to identify any application calls performed in a predetermined period of time within the computing environment; for each identified application call, building, by the application system, a corresponding application characteristics entry in a database; for each identified application call, identifying, by the application system, a plurality of characteristics of the called application; associating, by the application system, the identified plurality of characteristics of the called application with the application characteristics entry in the database, thereby creating an application mapping; identifying, by the application system, one or more security controls associated with each of the applications in the application mapping; associating, by the application system, the identified one or more security controls with the associated application characteristics entry in the application mapping; and automatically triggering assessment, by the application system, of an effectiveness of the one or more security controls in response to identifying a future application call.

In some embodiments, the method also includes periodically performing subsequent queries; and adding an additional application characteristics entry in the application mapping of the database.

In some embodiments, the method also includes automatically initiating a reporting transmission to one or more administrative systems, wherein the reporting transmission comprises information related to the assessment.

In some embodiments, the method also includes initiating presentation of an administrative dashboard comprising information related to the assessment access management controls; and exposure-application mapping information.

In some embodiments, the method includes transmitting instructions to two or more disparate control systems requesting information related to at least two different security controls associated with the future application call, wherein at least one of the two different security controls are managed by each of the two or more control systems; receiving responses from the two or more control systems; and communicating information from the responses to an administrative system.

In some embodiments, the method includes initiating communication of information related to the assessment to one or more control owners associated with the one or more security controls.

In some embodiments, the method includes, in response to the assessment, automatically initiating remedial actions.

According to embodiments of the invention, a computer program product for monitoring usage of an application to identify characteristics and trigger security control includes a non-transitory computer-readable medium comprising a set of code, that when executed by a processor cause the processor to perform a query configured to identify any application calls performed in a predetermined period of time within the computing environment; for each identified application call, build a corresponding application characteristics entry in a database; for each identified application call, identify a plurality of characteristics of the called application; associate the identified plurality of characteristics of the called application with the application characteristics entry in the database, thereby creating an application mapping; identify one or more security controls associated with each of the applications in the application mapping; associate the identified one or more security controls with the associated application characteristics entry in the application mapping; and automatically trigger assessment of an effectiveness of the one or more security controls in response to identifying a future application call.

In some embodiments, the set of code further causes the processor to periodically perform subsequent queries; and add an additional application characteristics entry in the application mapping of the database.

In some embodiments, the set of code further causes the processor to automatically initiate a reporting transmission to one or more administrative systems, wherein the reporting transmission comprises information related to the assessment.

In some embodiments, the set of code further causes the processor to initiate presentation of an administrative dashboard comprising information related to the assessment; access management controls; and exposure-application mapping information.

In some embodiments, the set of code further causes the processor to transmit instructions to two or more disparate control systems requesting information related to at least two different security controls associated with the future application call, wherein at least one of the two different security controls are managed by each of the two or more control systems; receive responses from the two or more control systems; and communicate information from the responses to an administrative system.

In some embodiments, the set of code further causes the processor to initiate communication of information related to the assessment to one or more control owners associated with the one or more security controls.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
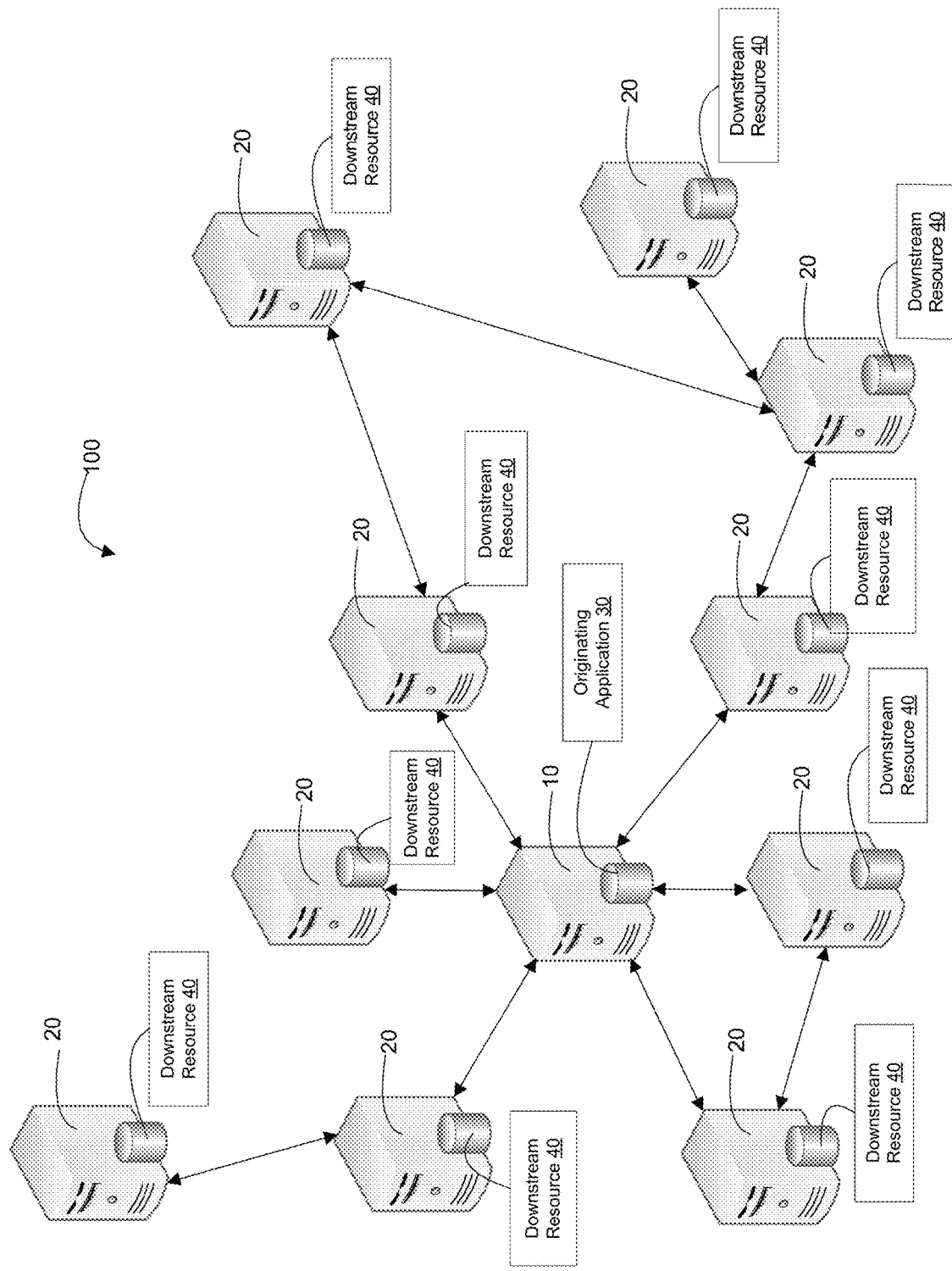
Figure 2:
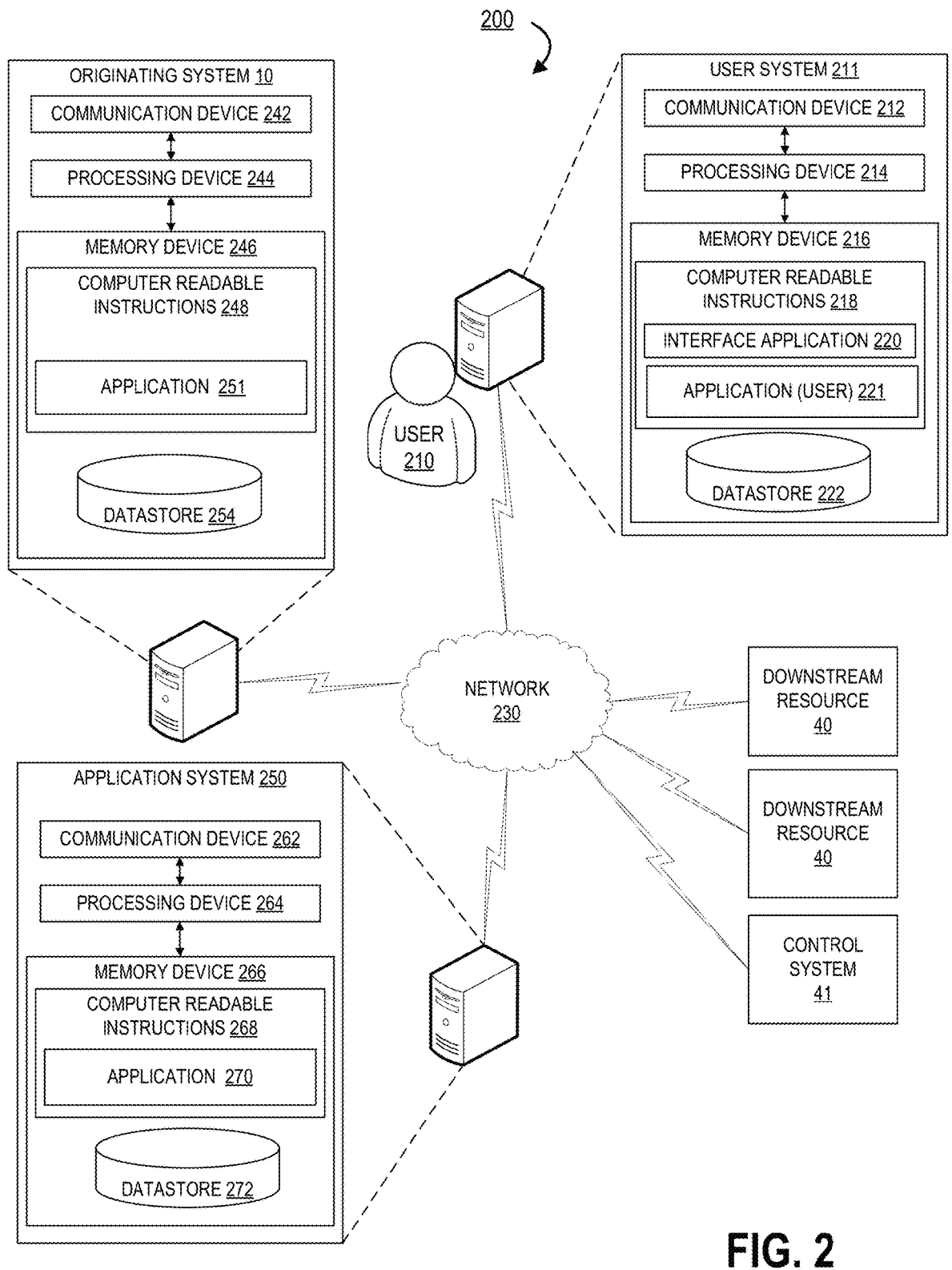
Figure 3:
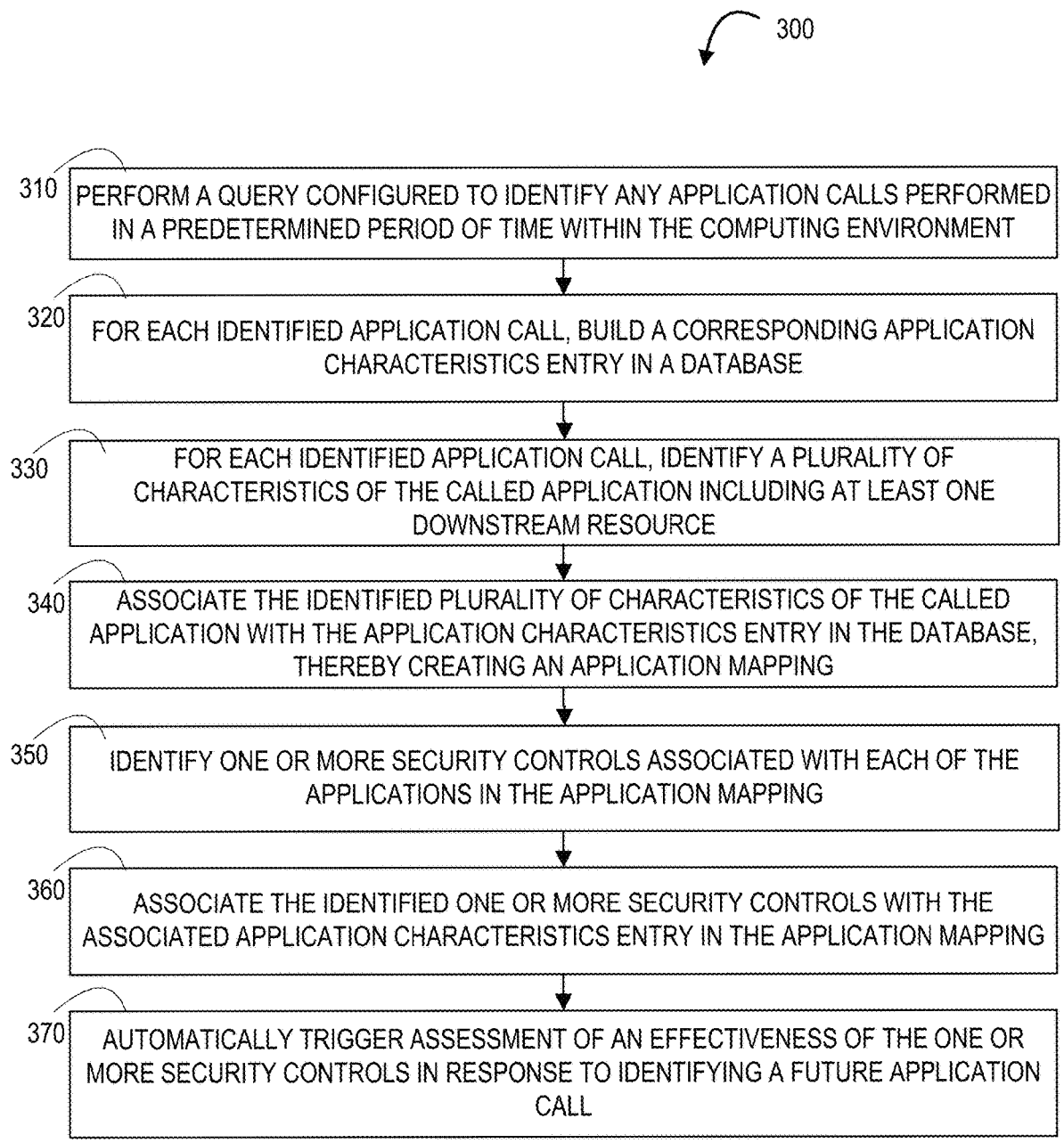
Figure 4:
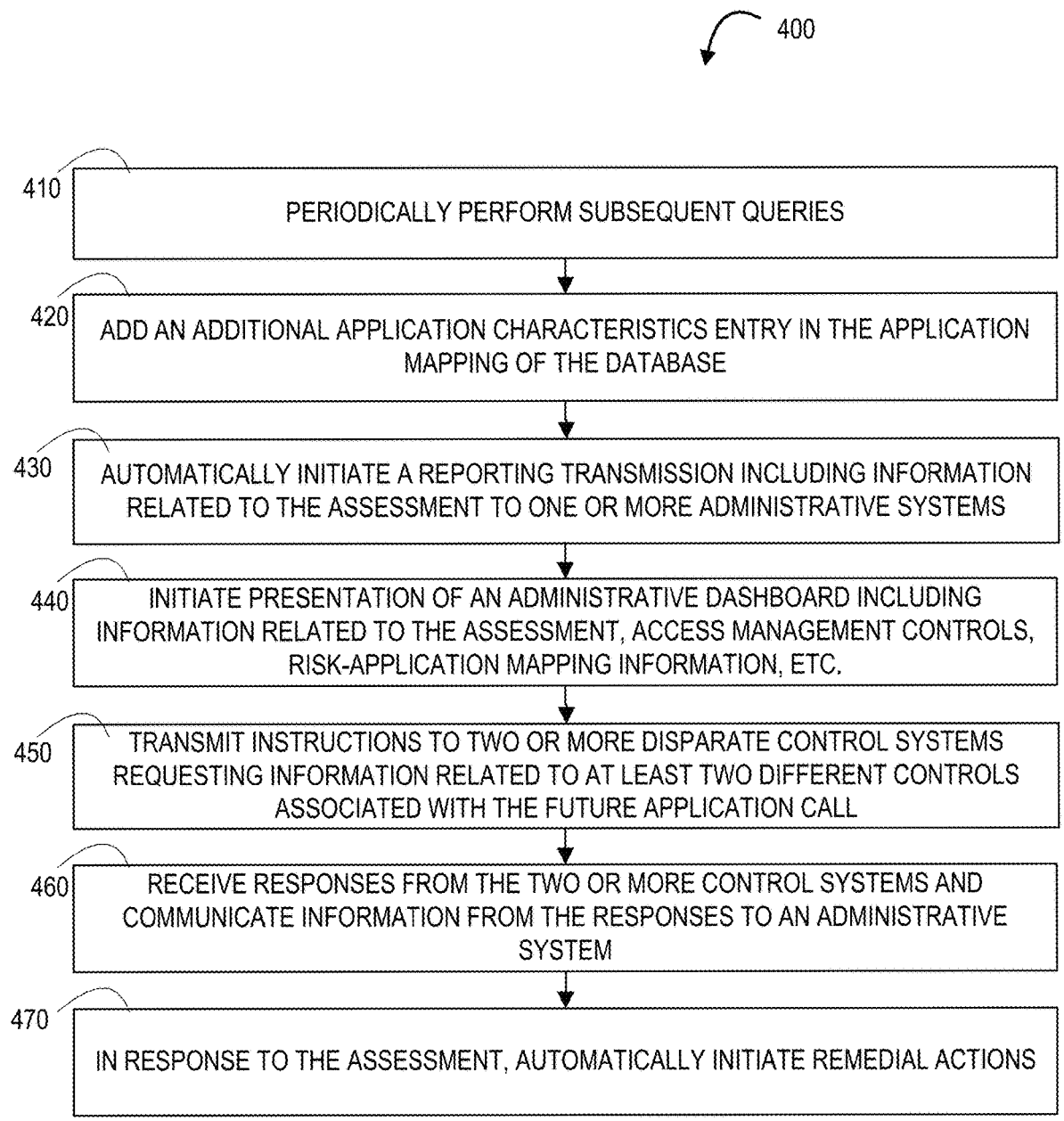

Having thus described embodiments of the invention in general terms, reference will now be made to the accompanying drawings, which are not necessarily drawn to scale, and wherein:

FIG. 1 provides a schematic diagram of a system for monitoring usage of an application to identify characteristics and trigger security control, in accordance with embodiments of the present invention;

FIG. 2 provides a schematic diagram of an environment in which systems discussed herein operate, in accordance with embodiments of the present invention;

FIG. 3 provides a flowchart of a method for monitoring usage of an application to identify characteristics and trigger security control, in accordance with embodiments of the present invention; and FIG. 4 provides a flowchart of a method for monitoring usage of an application to identify characteristics and trigger security control including additional steps, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are provided for monitoring usage of an application to identify characteristics and trigger security control.

Embodiments of the system identify an application being implemented within an entity. The system may identify characteristics of that application, such as the third party vendor, data accessible by the application, or the like. Based on the characteristics of the application, the system drives an appropriate security control on the back-end for the application.

More specifically, embodiments of the invention provide a computing environment for monitoring usage of an application to identify characteristics and trigger security control includes an application system that performs a query configured to identify any application calls performed in a predetermined period of time within the computing environment; for each identified application call, builds a corresponding application characteristics entry in a database; for each identified application call, identifies a plurality of characteristics of the called application including at least one downstream resource; associates the identified plurality of characteristics with the application characteristics entry in the database, thereby creating an application mapping; identifies security controls associated with each of the applications in the application mapping; associates the identified security controls with the associated application characteristics entry in the application mapping; and automatically triggers assessment of an effectiveness of the security controls in response to identifying a future application call.

Referring to FIG. 1, a schematic diagram is provided of a system 100 for monitoring usage of an application to identify characteristics and trigger security control, in accordance with embodiments of the present invention. In some embodiments, the system 100 is configured as a hub-and-spoke model, in which the originating system 10 represents a hub to the various "downstream" or "spoke" resources that are affected by the originating application called by the originating system 10. In other words, the originating system 10 may be a server, system, computer or the like that includes an originating application 30 that, when called either by the originating system 10 or some other system, requires the call of one or more downstream or spoke resources (such as data calls, application calls or the like) which may run on one or more downstream or spoke servers 20, which may be implemented throughout an enterprise or network. Such spoke servers may be deployed in a "hub-and-spoke" formation, and/or may be deployed in one or more linear communication pathways from the originating system 10 along with various interconnections between spoke servers 20 as shown in FIG. 1. For example, the originating system 10 may run an originating application 30 that requires the call of numerous downstream resources 40, one of which is called on a spoke server 20 directly connected with the originating system 10 and another of which is called on a sub-spoke server (not shown) directly connected with the spoke server 20 but not directly connected with the originating system 10, and so forth. To be clear, one linear communication pathway may connect the originating system 10 with one or more spoke servers 20 and sub-spoke servers, or two or more linear and/or more complex communication pathways may connect the originating system 10 with one or more spoke and sub-spoke servers. In a similar fashion, an application system (discussed later) may be connected directly and/or in a relatively complex fashion with various control systems for communication of control information (not shown here).

The spoke servers 20 may be one or more systems or servers and may constitute or include one or more communication pathways, channels or systems configured to communicate instructions for calling one or more downstream resources 40.

The downstream resources 40 may be required for performance of the originating application or may be optional for performance of the originating application. In some scenarios, the downstream resources 40 may be called and subsequently it may be determined that a downstream resource 40 may be unnecessary for a particular instance of an originating application 30. In some embodiments, the invention distinguishes between such applications such that calling of a downstream resource that is unnecessary for operation of an originating application 30 may not be considered a connection.

Referring now to FIG. 2, an environment 200 in which an originating system 240, an application system 250, and multiple spoke systems 20 operate is illustrated, in accordance with some embodiments of the invention. The environment 200 includes a user system 211 associated or used with authorization of a user 210 (e.g., an associate, a manager, a vendor or the like), an originating system 10 and multiple spoke systems 20 (represented by downstream resources 40 in the figure). In some embodiments, one or more of the spoke systems 20 are external systems, which may be maintained or managed by third party entities.

The systems and devices communicate with one another over the network 230 and perform one or more of the various steps and/or methods according to embodiments of the disclosure discussed herein. The network 230 may include a local area network (LAN), a wide area network (WAN), and/or a global area network (GAN). The network 230 may provide for wireline, wireless, or a combination of wireline and wireless communication between devices in the network. In one embodiment, the network 230 includes the Internet.

The user system 211, the originating stem 10 (or hub server) and the application systems 250 (or spoke servers) each include a computer system, server, multiple computer systems and/or servers or the like. The originating system 10, in the embodiments shown has a communication device 242 communicably coupled with a processing device 244, which is also communicably coupled with a memory device 246. The processing device 244 is configured to control the communication device 242 such that the originating system 10 communicates across the network 230 with one or more other systems. The processing device 244 is also configured to access the memory device 246 in order to read the computer readable instructions 248, which in some embodiments includes one or more applications 251 or modules, which may or may not be the same as applications and/or modules running on the user system 211 and/or the application system 250. The memory device 246 also includes a datastore 254 or database for storing pieces of data that can be accessed by the processing device 244. In some embodiments, the datastore 254 includes an application exposure-characteristic mapping as discussed herein.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

Furthermore, as used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

In some embodiments, data related to exposure-characteristic mappings may be stored in a non-volatile memory distinct from instructions for executing one or more process steps discussed herein that may be stored in a volatile memory such as a memory directly connected or directly in communication with a processing device executing the instructions. In this regard, some or all the process steps carried out by the processing device may be executed in near-real-time, thereby increasing the efficiency by which the processing device may execute the instructions as compared to a situation where one or more of the instructions are stored and executed from a non-volatile memory, which may require greater access time than a directly connected volatile memory source. In some embodiments, one or more of the instructions are stored in a non-volatile memory and are accessed and temporarily stored (i.e., buffered) in a volatile memory directly connected with the processing device where they are executed by the processing device. Thus, in various embodiments discussed herein, the memory or memory device of a system or device may refer to one or more non-volatile memory devices and/or one or more volatile memory devices.

The user system 211 includes a communication device 212 communicably coupled with a processing device 214, which is also communicably coupled with a memory device 216. The processing device 214 is configured to control the communication device 212 such that the user system 211 communicates across the network 230 with one or more other systems. The processing device 214 is also configured to access the memory device 216 in order to read the computer readable instructions 218, which in some embodiments includes an interface application 220 and application 221. The memory device 216 also includes a datastore 222 or database for storing pieces of data that can be accessed by the processing device 214.

The application system 250 includes a communication device 262 communicably coupled with a processing device 264, which is also communicably coupled with a memory device 266. The processing device 264 is configured to control the communication device 262 such that the spoke system 20 communicates across the network 230 with one or more other systems. The processing device 264 is also configured to access the memory device 266 in order to read the computer readable instructions 268, which in some embodiments includes an application 270. The memory device 266 also includes a datastore 272 or database for storing pieces of data that can be accessed by the processing device 264.

In some embodiments, the application 251, the application 221 and the application 270 interact with one another to implement the process steps described herein. In some embodiments, the application 251 is called and one or more spoke applications such as application 270 are called to support application 251. In some such cases, the application 221 queries the system or environment periodically as described herein to identify the application calls and their various characteristics and associated exposures, among other process steps described further below.

The applications 220, 221, 251, and 270 are for instructing the processing devices 214, 244 and 264 to perform various steps of the methods discussed herein, and/or other steps and/or similar steps. In various embodiments, one or more of the applications 220, 221, 251, and 270 are included in the computer readable instructions stored in a memory device of one or more systems or devices other than the systems 10, 20 and 211. For example, in some embodiments, the application 220 is stored and configured for being accessed by a processing device of one or more external systems 21 connected to the network 230. In various embodiments, the applications 220, 221, 251, and 270 stored and executed by different systems/devices are different. In some embodiments, the applications 220, 221, 251, and 270 stored and executed by different systems may be similar and may be configured to communicate with one another, and in some embodiments, the applications 220, 221, 251, and 270 may be considered to be working together as a singular application despite being stored and executed on different systems.

In various embodiments, one of the systems discussed above, such as the originating system 10, is more than one system and the various components of the system are not collocated, and in various embodiments, there are multiple components performing the functions indicated herein as a single device. For example, in one embodiment, multiple processing devices perform the functions of the processing device 244 of the originating system 10 described herein. In various embodiments, the originating system 10 includes one or more of the external systems 21 and/or any other system or component used in conjunction with or to perform any of the method steps discussed herein.

In various embodiments, the originating system 10, the application system 250, and the user system 211 and/or other systems may perform all or part of one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Referring now to FIG. 3, a flowchart illustrates a method 300 for monitoring usage of an application to identify characteristics and trigger security control according to embodiments of the invention. The first step, as represented by block 310 is to perform a query configured to identify any application calls performed in a predetermined period of time within the computing environment. This may be done by checking one or more log files regularly or constantly to determine whether an application has been called. Log files may also be used to determine which resources (such as other applications, data, hardware and/or the like) are accessed and/or called by the application, and thus may pose an exposure hazard.

The next step, as represented by block 320, is for each identified application call, to build a corresponding application characteristics entry in a database. The entry may include information relating the application to the resources on which it depends or which it accesses. Thus, when a particular application is called, the entry indicates all of the potential contacts made by the application while running. The next step, as represented by block 330, is for each identified application call, to identify a plurality of characteristics of the called application including at least one downstream resource. In some embodiments, the system may predict which resources may be used by the application based on one or more of its characteristics. For example, the application may be similar to one or more applications based on one or more characteristics. By drawing such a comparison, the system may predict that the application will use one or more of the same resources as the similar application. In this way, the system may enable a predictive exposure prevention rather than necessarily relying solely on an identification of resources that the application has called or accessed in the past and their correlated potential exposures.

The next step, as represented by block 340, is to associate the identified plurality of characteristics of the called application with the application characteristics entry in the database, thereby creating an application mapping.

Next, as represented by block 350, the system identifies one or more security controls associated with each of the application in the applications in the application mapping. A security control may be process configured to move a metric or group of metrics from a current state to a desired state. For example, a security control may involve the number of systems that have an anti-malware application installed within an entity, and the goal metric may be that 100% of the entity systems have the anti-malware application installed. Thus, the control may provide tasks or projects, accountability, and/or vision or the like into the progress of the process to reach the goal.

Then, as represented by block 360, the system associates the identified one or more security controls with the associated application characteristics entry in the application mapping. Then, the system automatically triggers an assessment of an effectiveness of the one or more security controls in response to identifying a future application call, as represented by block 370. Such an assessment may measure an exposure at a previous time to an exposure at a present time, correlating the control to the change and determining what effect, if any, the control had on moving the exposure into a desired level of concern.

Various communication channels may exist among multiple systems of an entity or environment as represented in FIGS. 1 and 2 by the downstream resources 40 and their connections with the originating system 10. Similarly, in various embodiments, various communication channels may exist among between the originating system and/or the application system and one or more control systems 41. In various embodiments, only one channel is used between the originating system and/or the application system and the downstream resources and/or control systems. In some cases, more than one channel is used. In some cases, only those channels with relevant information are used. This may be determined based on user input or based on communications from network systems such as a business group's server sending instructions to the originating and/or application system to configure and/or activate a communication channel with a downstream resource or control system so that relevant information may be communicated across the channel. In some cases, when the network system detects that new information or otherwise relevant information may be available at one or more control systems, the network system sends control signals that cause the application system to establish a dedicated communication channel between the application system and the one or more control systems that may have relevant information. In some cases, the dedicated communication channel is optimized so that the information may be communicated more efficiently than is could be over a non-dedicated communication channel. For example, a non-dedicated communication channel may utilize insecure network connections or systems or may utilize unstable or noise-prone network connections or systems. Thus, when establishing a dedicated communication channel, the application system may optimize parameters of the dedicated communication channel such that the communication channel is less prone to interruption from security breach, other traffic, offline systems or the like. This may be done by, for example, designating certain systems on the network between the application system and the various control systems, respectively, as low-functioning, medium-functioning, or high-functioning network systems/hubs/connections/channels (collectively referred to as connected systems). In various other embodiments, the number of categories of systems may be raised or lowered. For example, there may be five (5) distinct categories of systems. The various connected systems may be categorized by one or more administrators and/or automatically based on one or more monitoring modules or applications running on the application and/or control systems. Such a monitoring system may flag any abnormalities in network communication such as an unintended offline network system, a security breach of a network system, a network communication affected negatively by noise or interference (in some cases based on a predetermined threshold of interference or communication errors). Thus, once various connected systems are categorized, the network systems and/or the application system may optimize the dedicated communication channel by selecting appropriately categorized connected systems for the communication channel. For example, the application system may establish a dedicated communication channel in order to receive information associated with high priority controls (as indicated by an administrator system, for example, in its control signals to the application system). When establishing the dedicated communication channel, the application system may only select high-functioning connected systems in order to ensure that the high priority information may be reliably communicated from the control system(s) to the application system. In another example, certain connected systems are designated or categorized and always provided a dedicated (or non-dedicated) communication channel based on their respective categorization.

Referring now to FIG. 4, a flowchart illustrates a method 400 for monitoring usage of an application to identify characteristics and trigger security control including one or more additional (and in some cases optional) steps according to embodiments of the invention. The first step, as represented by block 410, is to periodically perform subsequent queries and, as a result of such queries, perform the various steps disclosed herein, thereby resulting in adding additional application characteristics entries in the application mapping of the database to the file (or updating existing entries in the mapping), as represented by block 420.

The next step, as represented by block 430, is to automatically initiate a reporting transmission including information related to the assessment to one or more administrative systems. The next step, as represented by block 440, is to initiate presentation of an administrative dashboard including information related to the assessment, access management controls, exposure-application mapping information and/or the like.

The next step, as represented by block 450, is to transmit instructions to two or more disparate control systems requesting information related to at least two different controls associated with the future application call. Next, as represented by block 460, the system receives responses from the two or more control systems and communicates information from the responses to an administrative system.

Finally, as represented by block 470, the last step is to automatically initiate remedial action(s) in response to the assessment. Such remedial actions may be or include automatically instituting one or more processes such as a roll out of a particular security software application to high exposure systems, automatically removing particular applications or resource calls or relationships, particularly where such application calls or relationships may unnecessary. In some cases, an application call or resource access causes an exposure, and the system may automatically determine an alternative to the application call or exposure, thereby eliminating the exposure with a substitute application or exposure.

In some cases, embodiments of the system allow for creation of group and user profiles and designation of application types to the groups and individual users. Embodiments of the system herein described provides for existing exposure-characteristic mappings to be changed/edited (i.e., for application characteristics, exposure and associated controls), new application characteristic entries or mappings to be added or obsolete entries to be deleted and, as a result of such changes/additions/deletions, automatically adapt all resource and/or control dependencies that are affected by the change or addition.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computing environment for monitoring usage of an application to identify characteristics and trigger security control, the computing environment comprising:
    an originating system having a computing platform having a memory and at least one processor in communication with the memory;
    a plurality of networked communication channels each configured to communicate one or more of a plurality of instructions for interacting with one or more control systems and one or more downstream resources in response to calling of an originating application by the originating system; and
    an application system in operative communication with the originating system and the plurality of networked communication channels and for providing automatic application characteristic identification and triggering security control, and comprising a computing platform having a memory and at least one processor in communication with the memory, the memory comprising computer-executable instructions, that when executed cause the processor to:
  perform a query configured to identify any application calls performed in a predetermined period of time within the computing environment;
  for each identified application call, build a corresponding application characteristics entry in a database;
  for each identified application call, identify a plurality of characteristics of the called application including at least one downstream resource;
  associate the identified plurality of characteristics of the called application with the application characteristics entry in the database, thereby creating an application mapping;
  identify one or more security controls associated with each of the applications in the application mapping;
  associate the identified one or more security controls with the associated application characteristics entry in the application mapping; and
  automatically trigger assessment of an effectiveness of the one or more security controls in response to identifying a future application call.

2. The computing environment of claim 1, wherein the computer-executable instructions, when executed further cause the processor to:
  periodically perform subsequent queries; and
  add an additional application characteristics entry in the application mapping of the database.

3. The computing environment of claim 1, wherein the computer-executable instructions, when executed further cause the processor to:
  automatically initiate a reporting transmission to one or more administrative systems, wherein the reporting transmission comprises information related to the assessment.

4. The computing environment of claim 1, wherein the computer-executable instructions, when executed further cause the processor to:
  initiate presentation of an administrative dashboard comprising:
    information related to the assessment
    access management controls; and
    exposure-application mapping information.

5. The computing environment of claim 1, wherein the computer-executable instructions, when executed further cause the processor to:
  transmit instructions to two or more disparate control systems requesting information related to at least two different security controls associated with the future application call, wherein at least one of the two different security controls are managed by each of the two or more control systems;
  receive responses from the two or more control systems; and
  communicate information from the responses to an administrative system.

6. The computing environment of claim 1, wherein the computer-executable instructions, when executed further cause the processor to:
  initiate communication of information related to the assessment to one or more control owners associated with the one or more security controls.

7. The computing environment of claim 1, wherein the computer-executable instructions, when executed further cause the processor to:
  in response to the assessment, automatically initiate remedial actions.

8. A method for monitoring usage of an application to identify characteristics and trigger security control, the method comprising:
  performing, by an application system, a query configured to identify any application calls performed in a predetermined period of time within the computing environment;
  for each identified application call, building, by the application system, a corresponding application characteristics entry in a database;
  for each identified application call, identifying, by the application system, a plurality of characteristics of the called application;
  associating, by the application system, the identified plurality of characteristics of the called application with the application characteristics entry in the database, thereby creating an application mapping;
  identifying, by the application system, one or more security controls associated with each of the applications in the application mapping;
  associating, by the application system, the identified one or more security controls with the associated application characteristics entry in the application mapping; and
  automatically triggering assessment, by the application system, of an effectiveness of the one or more security controls in response to identifying a future application call.

9. The method of claim 8, further comprising:
  periodically performing subsequent queries; and
  adding an additional application characteristics entry in the application mapping of the database.

10. The method of claim 8, further comprising:
  automatically initiating a reporting transmission to one or more administrative systems, wherein the reporting transmission comprises information related to the assessment.

11. The method of claim 8, further comprising:
  initiating presentation of an administrative dashboard comprising:
    information related to the assessment
    access management controls; and
    exposure-application mapping information.

12. The method of claim 8, further comprising:
  transmitting instructions to two or more disparate control systems requesting information related to at least two different security controls associated with the future application call, wherein at least one of the two different security controls are managed by each of the two or more control systems;
  receiving responses from the two or more control systems; and
  communicating information from the responses to an administrative system.

13. The method of claim 8, further comprising:
  initiating communication of information related to the assessment to one or more control owners associated with the one or more security controls.

14. The method of claim 8, further comprising:
  in response to the assessment, automatically initiating remedial actions.

15. A computer program product for monitoring usage of an application to identify characteristics and trigger security control, the computer program product comprising a non-transitory computer-readable medium comprising a set of code, that when executed by a processor cause the processor to:

perform a query configured to identify any application calls performed in a predetermined period of time within the computing environment;

for each identified application call, build a corresponding application characteristics entry in a database;

for each identified application call, identify a plurality of characteristics of the called application;

associate the identified plurality of characteristics of the called application with the application characteristics entry in the database, thereby creating an application mapping;

identify one or more security controls associated with each of the applications in the application mapping;

associate the identified one or more security controls with the associated application characteristics entry in the application mapping; and automatically trigger assessment of an effectiveness of the one or more security controls in response to identifying a future application call.

16. The computer program product of claim 15, wherein the set of code further causes the processor to:

periodically perform subsequent queries; and add an additional application characteristics entry in the application mapping of the database.

17. The computer program product of claim 15, wherein the set of code further causes the processor to:

automatically initiate a reporting transmission to one or more administrative systems, wherein the reporting transmission comprises information related to the assessment.

18. The computer program product of claim 15, wherein the set of code further causes the processor to:

initiate presentation of an administrative dashboard comprising:

information related to the assessment access management controls; and exposure-application mapping information.

19. The computer program product of claim 15, wherein the set of code further causes the processor to:

transmit instructions to two or more disparate control systems requesting information related to at least two different security controls associated with the future application call, wherein at least one of the two different security controls are managed by each of the two or more control systems;

receive responses from the two or more control systems; and communicate information from the responses to an administrative system.

20. The computer program product of claim 15, wherein the set of code further causes the processor to:

initiate communication of information related to the assessment to one or more control owners associated with the one or more security controls.

* * * * *